United States Patent [19]

Spicer et al.

[11] Patent Number: 5,151,685
[45] Date of Patent: Sep. 29, 1992

[54] WATER LEVEL ALARM APPARATUS

[76] Inventors: William W. Spicer, 13050 Forts Lake Rd., Grand Bay, Ala. 36541; Warren R. Spicer, 4565 Grand Bay Wilmer Rd., Mobile, Ala. 36695

[21] Appl. No.: 668,234

[22] Filed: Mar. 12, 1991

[51] Int. Cl.[5] ............................................. G08B 21/00
[52] U.S. Cl. ................................... 340/605; 340/604; 200/61.04
[58] Field of Search ............... 340/604, 605, 618, 616; 200/61.04, 61.05; 137/551, 558

[56] References Cited

U.S. PATENT DOCUMENTS 4,246,575 1/1981 Purtell et al. .................... 340/604 X
4,973,947 11/1990 Tax ....................................... 340/618

Primary Examiner—Jin F. Ng
Assistant Examiner—Jeffery A. Hofsass
Attorney, Agent, or Firm—Leon Gilden

[57] ABSTRACT

An alarm mounted within a housing, such as a drain housing of an air conditioner, including an elongate, planar sponge sheet, the sponge sheet mounted to a collar that is orthogonally affixed to a lower terminal end of a support tube, a switch includes a first component mounted on the sheet, and a second component fixedly secured to the tube space above the collar, wherein the sponge sheet is defined by a first thickness in a dehydrated configuration and wherein the sheet expands to a second thickness in a moistened configuration to effect electrical communication between the first and second member of the switch to complete an electrical circuit and effect actuation of an audible and/or visual signal member.

1 Claim, 4 Drawing Sheets

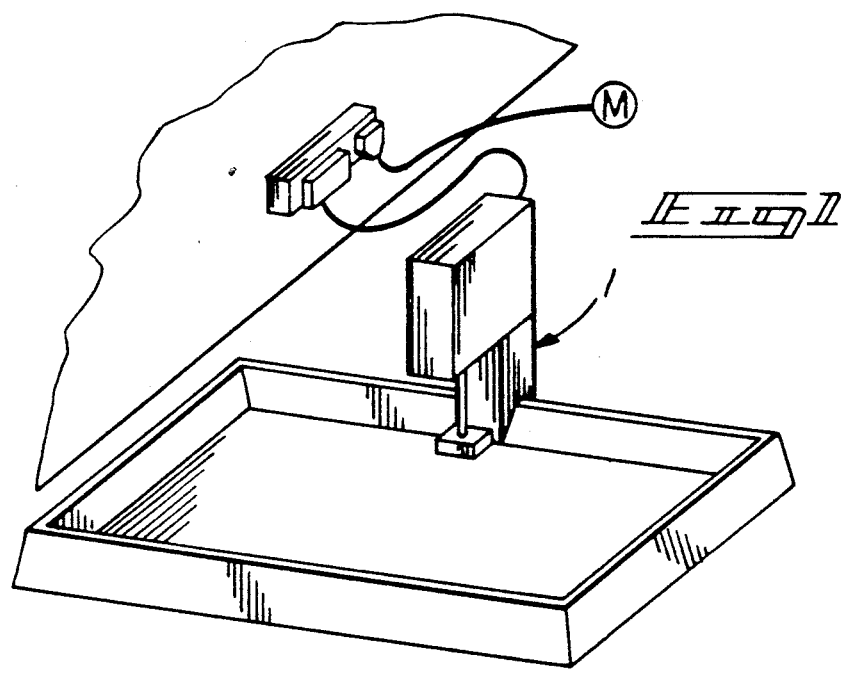
Fig 1
PRIOR ART
Fig 2
PRIOR ART
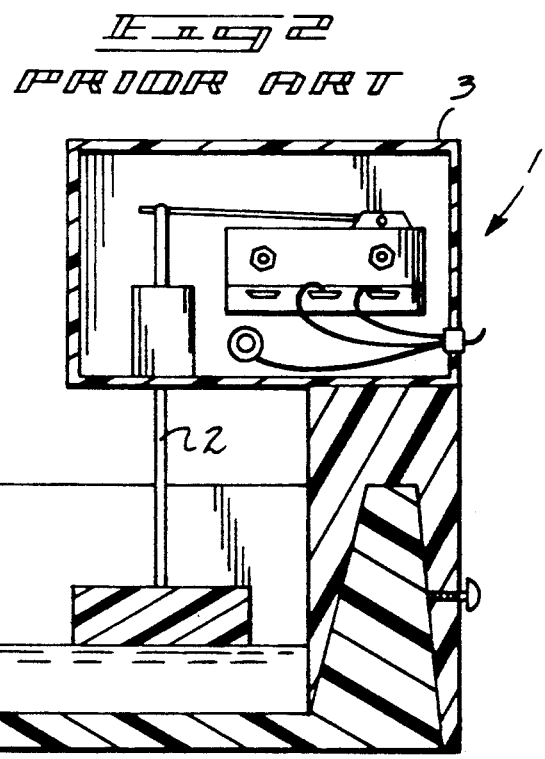

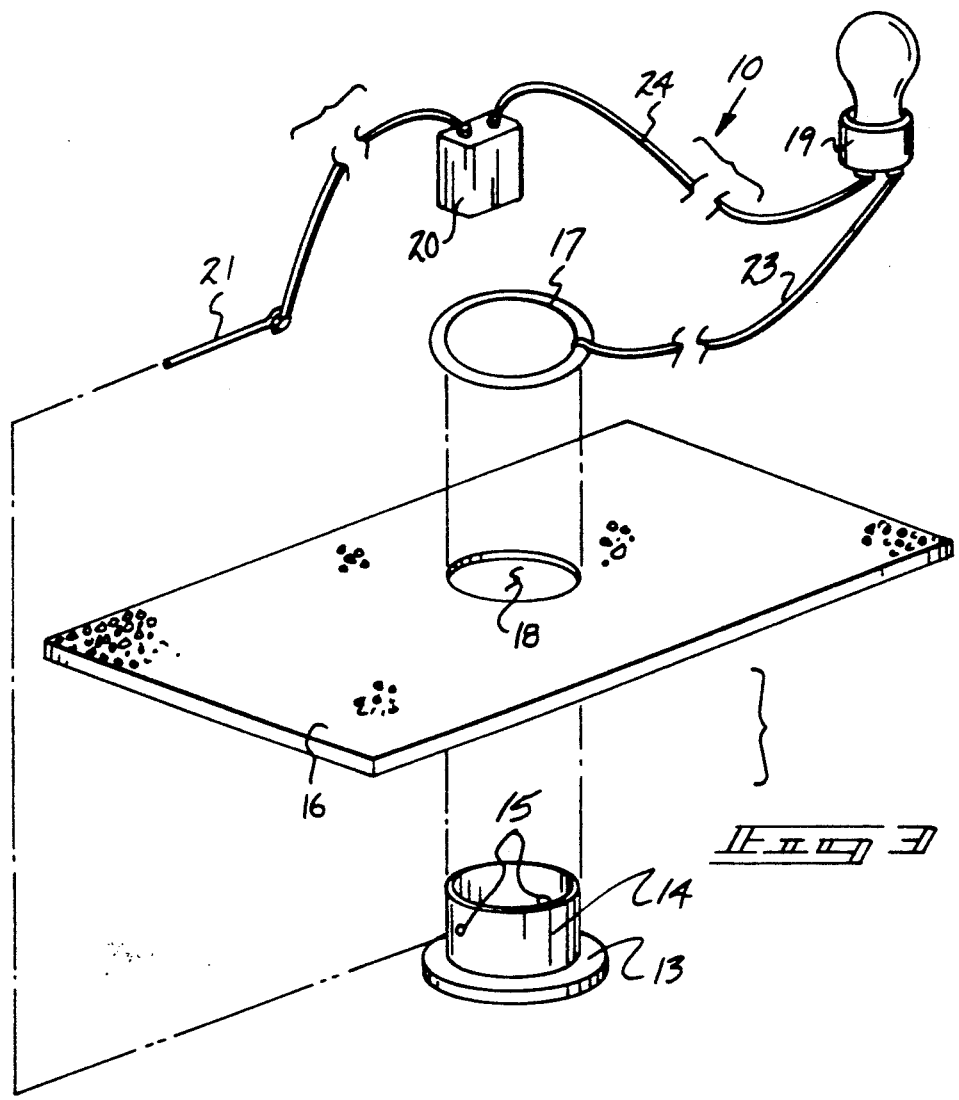
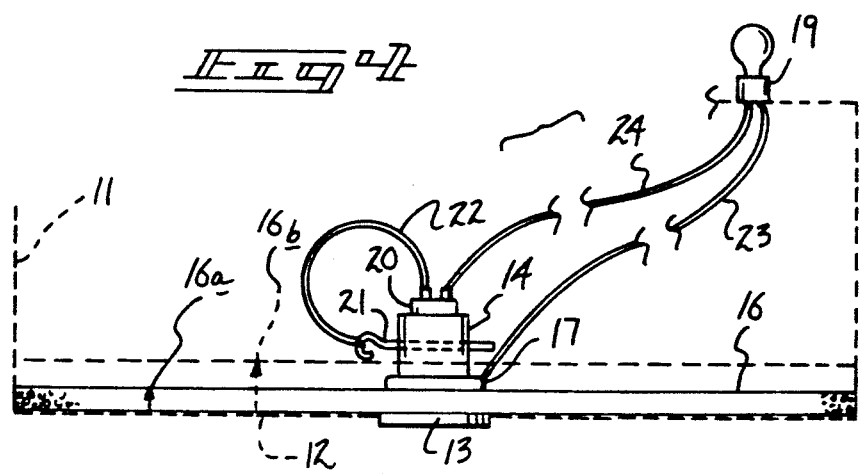

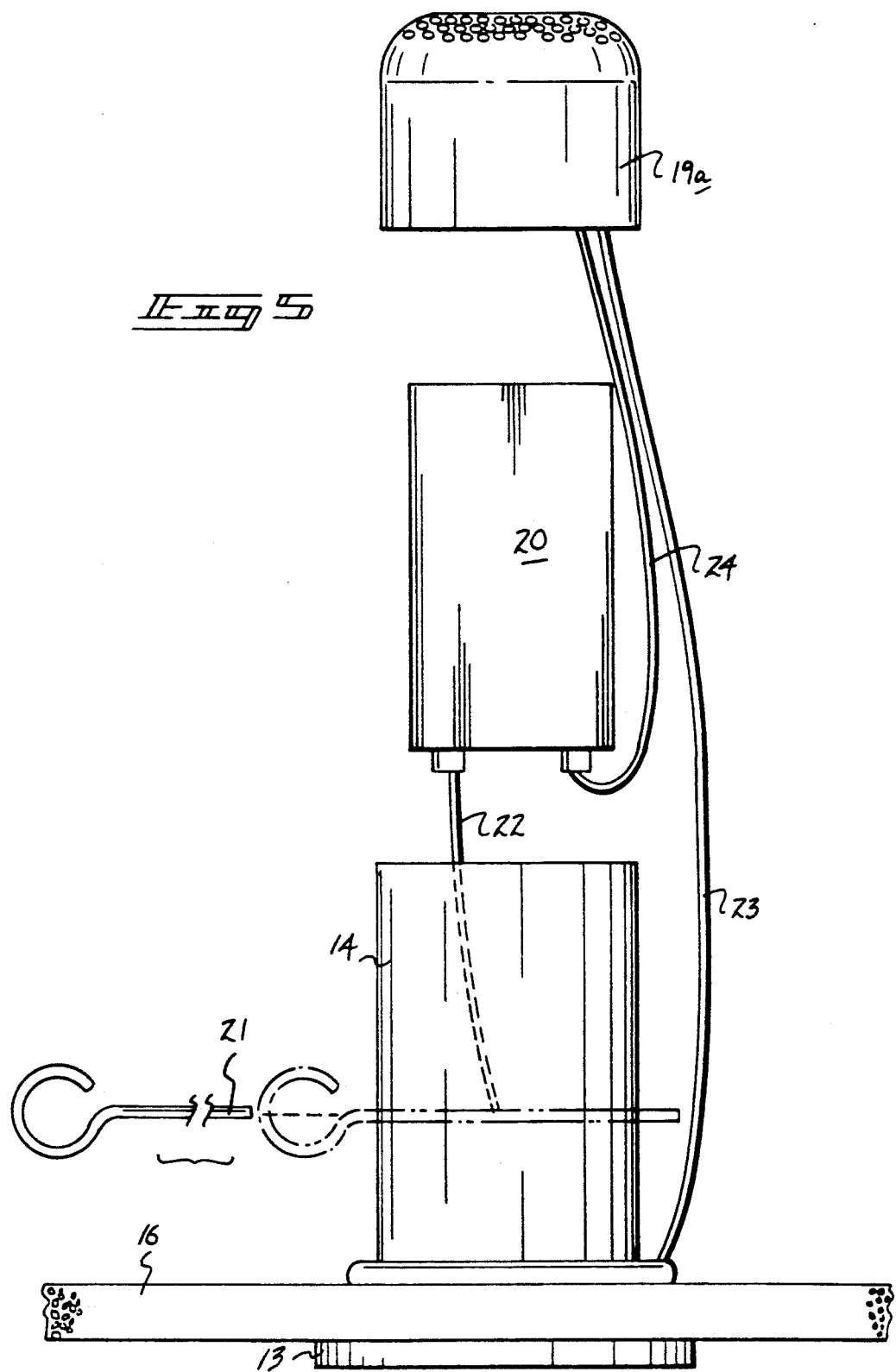

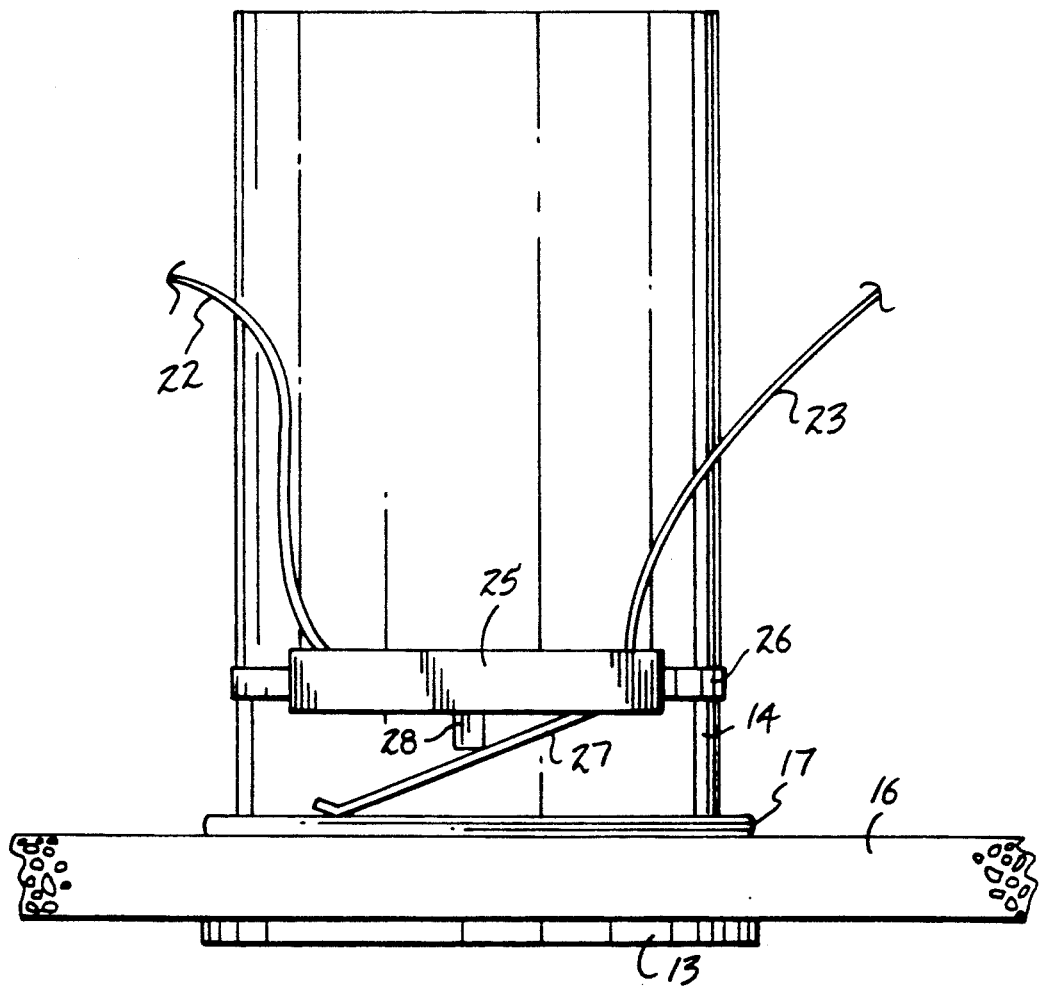

WATER LEVEL ALARM APPARATUS

BACKGROUND OF THE INVENTION

1. Field of the Invention

The field of invention relates to signal apparatus, and more particularly pertains to a new and improved water level alarm apparatus wherein the same effects actuation of an alarm upon availability of moisture within a housing.

2. Description of the Prior Art

Alarm apparatus of various types are available in the prior art. Heretofore, however, such apparatus has been of relatively complex and elaborate configuration. Particularly, in various moisture sensitive apparatus such as with air conditioning housings and the like, moisture is frequently undetected prior to damage occurring from moisture accumulation. The instant invention attempts to overcome deficiencies of the prior art by providing an organization effective upon detection of moisture within the housing prior to such moisture being available to effect damage. Prior art alarm apparatus may be found in U.S. Pat. No. 4,814,752 to Lehman wherein water contained within a tray includes a signal housing mounted relative to the tray, with a telescoping leg receivable within the housing to effect actuation of an alarm upon rising of water within the tray structure.

U.S. Pat. No. 2,602,846 to Polikoff sets forth an alarm apparatus for use in a bathtub, wherein a float member is pivotally mounted within the housing to effect completion of a signal member within the housing upon water level rising to a predetermined orientation within a bathtub structure.

U.S. Pat. No. 4,398,186 to Statz sets forth a further example of a pivoted float that effects actuation of an alarm upon the float rising upon detection of undesirable fluid levels.

U.S. Pat. No. 4,825,181 to Nagano sets forth a further example of a switch member turned on and off by a magnetic field.

U.S. Pat. No. 4,216,468 to Kaufmann sets forth a flood warning device wherein a float member is positioned within a drain to rise an effect actuation of an alarm upon water level in the drain rising to undesirable levels within the drain structure.

As such, it may be appreciated that there continues to be a need for a new and improved water level alarm apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of alarm apparatus now present in the prior art, the present invention provides a water level alarm apparatus wherein the same effects actuation of an audible and/or visual alarm upon expansion of a sponge in communication with undesirable fluid within a housing. As such, the general purpose of the present invention, which will be described subsequently in greater detail, is to provide a new and improved water level alarm apparatus which has all the advantages of the prior art alarm apparatus and none of the disadvantages.

To attain this, the present invention provides an alarm mounted within a housing, such as a drain housing of an air conditioner, including an elongate, planar sponge sheet, the sponge sheet mounted to a collar that is orthogonally affixed to a lower terminal end of a support tube, a switch includes a first component mounted on the sheet, and a second component fixedly secured to the tube spaced above the collar, wherein the sponge sheet is defined by a first thickness in a dehydrated configuration and wherein the sheet expands to a second thickness in a moistened configuration to effect electrical communication between the first and second member of the switch to complete an electrical circuit and effect actuation of an audible and/or visual signal member.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course. additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved water level alarm apparatus which has all the advantages of the prior art alarm apparatus and none of the disadvantages.

It is another object of the present invention to provide a new and improved water level alarm apparatus which may be easily and efficiently manufactured and marketed.

It is a further object of the present invention to provide a new and improved water level alarm apparatus which is of a durable and reliable construction.

An even further object of the present invention is to provide a new and improved water level alarm apparatus which is susceptible of a low cost of manufacture with regard to both materials and labor, and which accordingly is then susceptible of low prices of sale to the consuming public, thereby making such water level alarm apparatus economically available to the buying public.

Still yet another object of the present invention is to provide a new and improved water level alarm apparatus which provides in the apparatuses and methods of the prior art some of the advantages thereof, while simultaneously overcoming some of the disadvantages normally associated therewith.

Still another object of the present invention is to provide a new and improved water level alarm apparatus wherein the same effects actuation of an alarm upon actuation of a sponge member in communication with undesirable fluid within the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art water level alarm apparatus.

FIG. 2 is an orthographic cross-sectional illustration of the alarm apparatus as set forth in FIG. 1.

FIG. 3 is an isometric exploded view of the instant invention.

FIG. 4 is an orthographic side view, taken in elevation, of the invention mounted within an associated housing.

FIG. 5 is an orthographic side view of the alarm apparatus of the instant invention utilizing an audible signal member.

FIG. 6 is an orthographic side view of the instant invention utilizing a modified switching means.

DESCRIPTION OF THE PREFERRED EMBODIMENT

With reference now to the drawings, and in particular to FIGS. 1 to 6 thereof, a new and improved water level alarm apparatus embodying the principles and concepts of the present invention and generally designated by the reference numeral 10 will be described.

FIG. 1 illustrates a prior art water level alarm apparatus 1, as presented in U.S. Pat. No. 4,814,752, wherein an underlying tray mounts a switch housing 3 upon a rod 2 is telescopingly mounted relative to the switch housing upon water level within the tray rising to undersirable positions within the tray structure.

More specifically, the water level alarm apparatus 10 of the instant invention essentially comprises a collar 13 defined by a collar diameter fixedly and orthogonally mounted to a lower terminal end of the support tube 14. The support tube 14 is defined by a predetermined external diameter that is less than the collar diameter. The support tube 14 includes a plurality of diametrically aligned openings 15 directed orthogonally relative to an axis of the support tube 14 spaced above a top surface of the collar 13. An expandable sponge sheet 16 includes a central bore 18, wherein the central bore 18 is defined by a bore diameter substantially equal to the predetermined external diameter of the support tube 14. The expandable sponge sheet 16 mounts an electrically conducted torroidal ring 17 defined by a predetermined internal diameter substantially equal to the predetermined external diameter mounted to the sponge sheet in alignment with and about the central bore 18. An electrically conductive pin 21 is directed through the openings 15, whereupon the sponge sheet 16 is defined by a first thickness 16a positioning the ring 17 below the pin 21, whereupon the sheet 16 is expandable to a second thickness 16b (see FIG. 4) upon accumulation of moisture upon a housing floor 12 of the associated housing 11. It is noted that the collar 13 is mounted to the housing floor 12 to immediately receive moisture that may be accumulated upon the floor to effect expansion of the sponge sheet to a second thickness 16b to effect electrical communication between the ring 17 and the pin 21. A first signal member 19 defined either by a visual or audible member, such as a light or buzzer, is in electrical communication with a battery 20 that is positioned within the tube 14 overlying the pin 21. A first electrical transmission line 22 communicates the pin 21 with the first terminal end of the battery 20, wherein a second electrical transmission line 23 communicates the ring 17 with the signal member 19 and a third electrical transmission line 24 effects electrical communication between the signal member 19 and a second terminal end of the battery 20 where it may be observed that electrical communication of the pin 21 with the ring 17 effects completion of the associated electrical circuit effecting actuation of the signal member 19 defined either as a first signal member utilizing a light or a second signal member 19a (see FIG. 5) utilizing a buzzer or other suitable audible electrical signaling means. It is further noted that both the buzzer and light may be utilized in concert and typically mounted exteriorly of the housing 11 on an outer wall surface thereof for enhanced visual or audible acknowledgment by an individual.

FIG. 6 illustrates a modified switching organization, wherein a switch 25 mounts an exterior surface of the collar 13 utilizing a mounting strap 26. A spring leg 27 mounted at an upper end of the switch 25 includes a lower end in communication with the ring 17. A switch button 28 is positioned between the switch 25 and the spring leg 27, whereupon expansion of the sponge 16 to the aforenoted second thickness effects a lifting of the lower terminal end of the spring leg 25 to effect directing the switch button 28 within the switch 25 to complete electrical circuitry, such as illustrated in FIGS. 4 and 5 for example.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A water level alarm apparatus comprising, in combination, a floor, and a collar positioned on the floor, and a support tube defined by a predetermined external diameter, and the collar fixedly mounted to a lower terminal end of the support tube orthogonally oriented relative to an axis defined by the support tube, and expandable means mounted on the collar for expansion from a first dehydrated thickness to a second moistened thickness, and switch means for actuating a signal member, wherein the switch means includes a first member mounted to the expandable means and a second member mounted to the support tube, whereupon the first member and the second member are in separated orientation relative to one another when the expandable means is defined by the first thickness, and wherein the first and second members are in electrical communication relative to one another when the expandable means is defined by the second thickness, and a battery mounted within the support tube, wherein the first member, the second member, and the signal member are all in electrical communication through the switch means and the battery when the expandable means is defined by the second thickness, and the expandable means includes a sponge sheet, the sponge sheet including a central bore defined by the predetermined external diameter mounted upon a top surface of the collar, and the first member includes a torroidal electrically conductive ring fixedly mounted on the sponge sheet about the central bore of the sponge sheet in sliding communication with the support tube, wherein the ring is defined by an internal diameter substantially equal to the predetermined external diameter of the support tube, and the second member includes an electrically conductive pin, and the support tube includes a plurality of diametrically aligned openings orthogonally oriented relative to the axis of the support tube above the top surface of the collar wherein the second means is mounted.

* * * * *